United States Patent Office 3,321,501
Patented May 23, 1967

3,321,501
METALLOCENYL SUBSTITUTED ORGANOSILICON MATERIALS AND A METHOD FOR MAKING THEM
Edward V. Wilkus, Albany, and Abe Berger, Schenectady, N.Y., assignors to General Electric Company, a corporation of New York
No Drawing. Filed May 27, 1963, Ser. No. 283,525
17 Claims. (Cl. 260—429)

The present invention relates to substituted metallocenes, such as dicyclopentadienyliron, or ferrocene, having a silicon atom joined to the metallocene nucleus thru at least three carbon atoms. More particularly, the present invention relates to a method of acylating various metallocenes with a silylorganocarboxylic acid halide to provide for the production of a variety of silylorganometallocenes.

It is generally known by those skilled in the art, that metallocenes such as dicyclopentadienyliron, $(C_5H_5)_2Fe$, commonly known as ferrocene, have unusual aromatic character. Many of the metallocenes moreover, can be made readily by reacting metallated cyclopentadiene with the appropriate metal halide. As a result, considerable work has been done on investigating the properties of these metallocenes. Benkeser et al., for example, shows in J. Am. Chem. Soc., 76, 4025 (1954), that metallocenes such as ferrocene, can be made having triorganosilyl radicals attached directly to the metallocene nucleus by silicon-carbon linkages. Further investigation has shown moreover, that such silyl radicals are hydrolytically unstable and can be cleaved readily from the metallocene nucleus, particularly under acidic conditions. In addition, P. T. Schaaf et al., J. Org. Chem., 26, 1790 (1961), were unsuccessful in their attempts to make copolymers of chemically combined siloxane units and metallocene units by substituting the metallocene nucleus with diorganosilyl radicals. It was found by Schaaf et al., that metallocenes having diorganosilyl radicals bonded to the metallocene nucleus by silicon-carbon linkages, formed cyclic products rather than linear copolymers.

The present invention is based on the discovery that a metallocene, such as ferrocene can be directly acylated by a Friedel-Crafts method with certain silylorganocarboxylic acid halides, as shown hereinafter, to provide for the production of silylorganometallocenes. It has been found that these substituted metallocenes having at least three carbon atoms between the silicon atom and metallocene nucleus are hydrolytically stable, and can be used to form a variety of useful products including organometallocenesiloxane copolymers.

Unless otherwise designated, the term "metallocene" as employed in the description of the present invention is an organo metallic compound of a transition metal chemically combined with two five-membered carbocyclics substituted with either hydrogen, or a mixture of hydrogen with either monovalent electron donating radicals, or monovalent electron withdrawing radicals, or mixtures thereof. The term "transition metal" includes all metals of Group III to VIII of the Periodic Table capable of forming a π complex with two five-membered carbocyclics such as cyclopentadienyl radicals resulting in the formation of a metallocene having aromatic character. The transition metals that are operative in the present invention are for example, metals having atomic numbers 22 to 28, 40 to 46, and 72 to 78, such as titanium, vanadium, chromium manganese, iron, cobalt, nickel, zirconium, columbium, molybdenum, technetium, ruthenium, rhodium, palladium, hafnium, tantalum, tungsten, rhenium, osmium, iridium, and platinum.

The silylorganometallocenes of the present invention have at least one monovalent silylorganocarbofunctional radical of the formula:

(1)   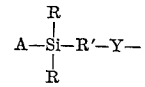

chemically bonded to a nucleus composed of a transition metal chemically combined with two five-membered carbocyclics whose free valences, other than those satisfied with said monovalent silylorganocarbofunctional radical, are satisfied with monovalent radicals selected from hydrogen, electron donating organic radicals, electron withdrawing organic radicals, and mixtures thereof, where R is a member selected from hydrogen, a halogen radical, an alkoxy radical, a monovalent hydrocarbon radical, a halogenated monovalent hydrocarbon radical, a cyanoalkyl radical, and a fluoroalkyl radical, A is a member selected from an R radical and a hydroxy radical, R' is a divalent radical of at least two carbon atoms selected from a hydrocarbon radical and a halogenated hydrocarbon radical, and Y is a carbofunctional radical selected from carbonyl, carbinol, methylene, carbamino, and carbazido.

Radicals included by R of Formula 1 are aryl radicals, and halogenated aryl radicals such as phenyl, chlorophenyl, xylyl, tolyl, etc.; aralkyl radicals such as phenylethyl, benzyl, etc.; aliphatic, haloaliphatic, and cycloaliphatic, such as alkyl, alkenyl, cycloalkyl, haloalkyl, including methyl, ethyl, propyl, butyl, cyclohexyl, etc., halogen radicals such as chloro, bromo, etc.; alkoxy radicals such as methoxy, ethoxy, propoxy, heptoxy, etc.; cyanoalkyl radicals such as cyanoethyl, cyanopropyl, cyanobutyl, etc.; and fluoroalkyl radicals such as fluoroethyl, fluoropropyl, fluorobutyl, etc. Radicals included by R' of Formula 1 are arylene radicals and alkylene radicals, such as phenylene, tolylene, ethylene, trimethylene, tetramethylene, pentamethylene, decamethylene, etc. Radicals included by A are all of the aforementioned R radicals, and a hydroxy radical. Except when A is hydroxy, R and A can be all the same radical or mixtures of the aforementioned R radicals.

Some of the silylorganometallocenes of the present invention can be made by (1) acylating a metallocene included by the present invention at a temperature between —25° C. to 100° C. with a silylorganocarboxylic acid halide having the formula:

(2)   

(2) hydrolyzing the acylated metallocene of (1), and (3) recovering the resulting silylorganometallocene, where R' is as defined above, R'' is a member selected from hydrogen, halogen radicals, monovalent, hydrocarbon radicals, halogenated monovalent hydrocarbon radicals, cyanoalkyl radicals and fluoroalkyl radicals as defined above, and X is a halogen radical.

A method for preparing some of the silylorganocarboxylic acid halides of Formula 2 is shown by Sommer et al., J. Am. Chem. Soc., 73, 5130 (1951), which involves the alkylation of a malonic ester with a haloalkyltrialkylsilane, followed by halogenating the resulting acid. Another method is shown by Petrov et al., D. Akad Nauk, SSSR, 100, 711 (1955), who utilize beta-cyanoalkyltrihalosilane which is initially alkylated and then hydrolyzed.

Included by the silylorganometallocenes that can be made by the employment of a silylorganocarboxylic acid halide of Formula 2, are ketones having at least one silylorganocarbonyl radical attached to a metallocene, as shown by the formula:

(3) 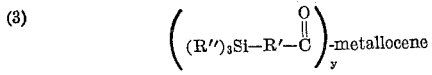

where R', R'', and metallocene are as defined above, and y is a positive integer equal to the number of chemically bonded silylorganocarbonyl radicals. The silylorgano-metallocenes of Formula 3 can be modified in accordance with standard chemical procedures to produce a variety of other silylorganometallocenes having silylorganocarbofunctional radicals shown by Formula 1. For example, the carbonyl groups of Formula 3 can be reduced to a methylene group or partially reduced to a carbinol group by standard chemical methods. Other chemical transformations can also be effected which are known to those skilled in the art.

Some of the preferred metallocenes of the invention are shown by M. D. Rausch et al., J. Am. Chem. Soc., 82, 76 (1960). These metallocenes are included by the formulae:

(4)     $[C_5H_5]_2M'$; $[C_5H_5]M'G$; $GM'G'$ where $M'$ is a metal selected from iron, osmium, and ruthenium, and $G$, and $G'$ are the same or different substituted cyclopentadienyl radicals having the formulae:

(5)     $[C_5(H)_a(Q)_b(Q')_c]$ where $a$ is a whole number equal to from 0 to 4, inclusive, $b$ is a whole number equal to from 0 to 4, inclusive, $c$ is a whole number equal to from 0 to 1, inclusive, and the sum of $a$, $b$, and $c$ is equal to 5; Q is a monovalent electron donating radical selected from aryl and hydroxyaryl radicals such as phenyl, tolyl, hydroxyphenyl, etc.; aliphatic radicals including alkyl radicals such as methyl, ethyl, propyl, butyl, actyl, etc.; alkenyl radicals such as vinyl, propenyl, etc.; cycloaliphatic radicals such as cyclohexyl, cycloheptyl, etc.; carboxyaliphatic radicals, such as carboxymethyl, carboxyethyl, etc.; triorganosilyl radicals such as trimethylsilyl, dimethylphenylsilyl, etc.; nitroaliphatic radicals such as nitromethyl, nitroethyl, etc.; a silylorgano radical, as shown in Formula 1, where Y is methylene, and mixtures of such radicals, and $Q'$ is a monovalent electron withdrawing radical selected from aliphatic acyl, such as formyl, acetyl, propionyl; arylacyl such as benzoyl, etc.; carboxy; aldehydic; sulfo; carboxyaryl, such as carboxyphenyl, carboxytolyl, etc.; nitroaryl such as nitrophenyl; haloaryl, such as chlorophenyl, bromotolyl, etc.; haloaliphatic such as chloromethyl, chloroethyl, etc.; a silylorgano radical of Formula 1 where Y is a carbonyl radical, and mixtures of such radicals.

As shown in Formula 4, certain of the metallocenes have at least one substituted cyclopentadienyl radical. Hereinafter, substitution in only one of the cyclopentadienyl radicals with at least two monovalent radicals will be designated as homoannular substitution. Heteroannular substitution will designate substitution in both cyclopentadienyl radicals, with substitution in one of the cyclopentadienyl radicals being represented by primed numbers.

Among the preferred silylorganometallocenes of the present invention are heteroannularly substituted silylorganometallocenes of the formula:

(5) 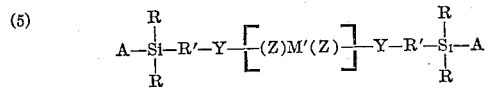

where A, R, R', Y, and M' are as defined above, and Z can be the same or different radical selected from,

where $d$ is a whole number equal to from 0 to 3, inclusive, $e$ is an integer equal to from 1 to 4, inclusive, and the sum of $d$ and $e$ is equal to 4, and $Q''$ can be Q or $Q'$ defined above.

Some of the silylorganometallocenes of the present invention that can be made directly from ferrocene, osmocene, and ruthenocene, as shown in Formula 4 are for example, trichlorosilylpropionylferrocene,
trimethylsilylpropionylosmocene,
trimethylsilylpropionylruthenocene,
dimethylphenylsilylpropionylferrocene,
dimethylhydroxysilylpropionylosmocene,
dimethylhydroxysilylpropionylferrocene,
trichlorosilylpropionylruthenocene,
dimethylchlorosilylpropionylferrocene,
trimethylsilylbenzoylruthenocene,
trimethylsilylphenylmethyleneosmocene,
dimethylsilyltetramethyleneferrocene,
methyldiphenylsilyltetramethyleneosmocene,
2-hydroxy, 4-trimethylsilylbenzoylferrocene, etc.

Silylorganometallocenes of the present invention that can be made from the substituted metallocenes for Formula 4 are homoannularly substituted 1,2-bis(trichlorosilylpropionyl)ferrocene,
1,2-bis(trimethylsilylpropionyl)ruthenocene,
1,2-bis(trimethylsilylpropionyl)osmocene,
1,2-bis(trimethylsilyltrimethylene)ferrocene,
1,2-bis(trimethylsilyltrimethylene)ruthenocene,
1,2-bis(trimethylsilyltrimethylene)osmocene,
1,2-bis(dimethylhydroxysilylpropionyl)ferrocene,
1,2-bis(dimethylhydroxysilylpropionyl)ruthenocene,
1,2-bis(dimethylhydroxysilylpropionyl)osmocene,
1,2-bis(dimethylvinylsilylpropionyl)ferrocene,
1,2-bis(dimethylvinylsilylpropionyl)ruthenocene,
1,2-bis(dimethylvinylsilylpropionyl)osmocene,
1-trimethylsilylpropionyl-2-trimethylsilyltrimethyleneferrocene,
1-trimethylsilylpropionyl-2-methylferrocene,
1-dimethylphenylsilylbutyryl-2-phenylruthenocene,
1-dimethylvinylsilylpentanoyl-2-sulfoosmocene,
1-trimethylsilylpropionyl-2-chlorophenylferrocene,
1-dimethylphenylsilylpropionyl-2-trimethylsilylosmocene,
1-trimethylsilylphenylmethylene-2-dimethylvinylsilyltrimethyleneosmocene, etc.

It is understood that 1,3-analogs can also be made.

Heteroannularly substituted silylorganometallocenes of the present invention that can be made from the substituted metallocenes of Formula 4 include 1,1'-bis-(trimethylsilylpropionyl)ferrocene, 1,1'-bis-(trimethylsilylpropionyl)-ruthenocene, 1,1'-bis(trimethylsilylpropionyl)-osmocene, 1,1'-bis(trimethylsilyltrimethylene)ferrocene, 1,1'-bis(trimethylsilyltrimethylene)ruthenocene, 1,1'-bis-(trimethylsilyltrimethylene)osmocene, 1,1'-bis(dimethylhydroxysilyl - propionyl)ferrocene, 1,1' - bis(dimethylhydroxysilylpropionyl)-ruthenocene, 1,1' - bis(dimethylhydroxysilylpropionyl)osmocene, 1,1'-bis(dimethylvinylsilylpropionyl)ferrocene, 1,1' - bis - (dimethylvinylsilylpropionyl)ruthenocene, 1,1'-bis(dimethylvinylsilylpropionyl)osmocene, 1-trimethylsilylpropionyl - 1'-trimethylsilyltrimethyleneferrocene, 1-trimethylsilylpropionyl-1'-methylferrocene, 1-dimethylphenylsilylbutanoyl-1'-phenylruthenocene, 1-dimethylvinylsilylpentanoyl - 1' - sulfoosmocene, 1-trimethylsilylpropionyl-1'-chlorophenyl-ferrocene, 1-dimethylphenylsilylpropionyl-1'-trimethylsilyl-osmocene, 1-trimethylsilylphenylmethylene - 1' - dimethylvinylsilyltrimethyleneosmocene, 1-trimethylsilylphenylmethylene-2-methyl-1'-dimethyvinylsilyltrimethyleneosmocene, 1-(2-hydroxybenzoyl)-1'-omega - trimethylsilylpropionyl - ferrocene.

In addition to making some of the silylorgano-metallocenes of the present invention, as shown by Formula 3, with a silylorganocarboxylic acid halide of Formula 2, silylorganometallocenes of the present invention also can be made by other methods. For example, a silylorgano-substituted cylopentadiene can be made by reacting metallated cyclopentadiene with a silylorgano radical in which the organo radical is a divalent hydrocarbon radical. The silylorganocyclopentadiene then can be metallated, such as with lithium, and the metallated intermediate then can be reacted with the appropriate metal halide, for example, ferric chloride to form a heteroannular substituted metallocene.

The silylorganometallocenes of the present invention consisting of at least one silylorganocarbo-functional radical as shown by Formula 1 chemically bonded to a metallocene nucleus can be utilized in a variety of applications. For example, the silylorgano-metallocenes of the present invention can be employed as U.V. absorbers, antiknock compounds, antioxidants, heat stabilizers for organopolysiloxane elastomers, extreme pressure lubricants and extreme pressure lubricant additives. As shown in copending application, Ser. No. 283,544, filed May 27, 1963, some of the silylorganometallocenes of the present invention can be employed to make polymers and co-polymers including symmetrical disiloxanes which can be utilized as chain-stopping radicals. The silylorganometallocenes of the present invention can also be employed as shown in copending application, Ser. No. 283,530, filed May 27, 1963, to make polymers of chemically combined organosiloxane units and metallocene units. These polymers also can be made into the form of room temperature vulcanizing polymers having superior oil reversion resistance and the like. Other applications to which the silylorganometallocenes of the present invention can be utilized are as follows: smoke eliminators, dyestuffs, photographic developers, rubber vulcanization accelerators, diesel fuel additive, metal-plating reagents, polymerization catalysts (for polyethylene, curable silicones, alkyd resins, drying oils), medicinals, fungicides, pesticides, agricultural chemicals, damping fluids, metallocene-containing vinyl monomers for polymerization as such, or with other monomers such as chloroprene, styrene, etc.; substrates which react with formaldehyde to give condensation polymers, etc.

In accordance with the practice of the invention, a metallocene is acylated with a silylorganocarboxylic acid halide, as shown by Formula 2 referred to hereinafter as the "silyl acid halide," and the resulting silylorganometallocene as shown by Formula 3 is recovered. The silylorganometallocene can be converted to various silyl-organometallocene derivatives, by standard chemical procedures, including when possible further acylation in accordance with the practice of the invention.

In most instances, the acylation of the metallocene can be accomplished by standard Friedel-Crafts methods. Experience has shown, however, that a modified Friedel-Crafts procedure must be employed when utilizing a silyl acid halide having no more than two carbon atoms between the silicon atom, and the carbonyl group. It has been found for example, that such silyl acid halides, for example, a silyl propionyl halide will decompose when mixed directly with a Friedel-Crafts catalyst such as an aluminum halide in the absence of the metallocene. Instead of forming a stable complex with the aluminum halide, silyl acid halides having no more than two carbon atoms between the silicon atom and the carbonyl group decompose to carbon monoxide and the corresponding halosilane and olefin, if the complex is formed in the absence of the metallocene as previously described. Generally, any standard Friedel-Crafts acylation procedure can be utilized for acylating the metallocene. In instances where a silyl acid halide such as propionyl halide is used however, it is preferred to add the Friedel-Crafts catalyst in small increments to a mixture of the metallocene and the silyl acid halide.

If desired, a suitable organic solvent can be utilized during the acylation of the metallocene to facilitate the acylation reaction. Suitable organic solvents are any organic solvents that are substantially inert to the reactants or to the conditions of the reaction and which facilitate the acylation of the metallocene. Suitable organic solvents include for example, methylene chloride, benzene, toluene, xylene, nitrobenzene, carbon disulfide, etc. Temperatures at which the acylation of the metallocene can be effected can vary widely. For example, a range of from −25° C. to 100° C. has been found operable, while a range of between 0° C. to 50°C. is preferred. Any standard Friedel-Crafts catalyst can be utilized to effect the acylation of the metallocene with the silyl acid halide. A preferred Friedel-Crafts catalyst is aluminum chloride. Other Friedel-Crafts catalysts that can be employed however, are for example, $BF_3$, $ZnCl_2$, $SnCl_4$, etc.

Except in instances where acylation of the metallocene is accomplished with a silyl acid halide, such as a silylpropionyl halide as discussed above, the acylation of the metallocene can be carried out by any one of several well known Friedel-Crafts procedures. One method, for example, involves forming a complex of the silyl acid halide of the Friedel-Crafts catalyst and then reacting the complex with the metallocene. Variations of this procedure can also be done. For example, the silyl acid halide can be added to a mixture of the aluminum halide and the metallocene.

The acylation of the metallocene will be completed when no further hydrogen halide, produced during the acylation reaction, is evolved. The acylated metallocene then can be hydrolyzed by standard procedures. An acidified mixture of water and ice can be employed for example. The final product can be extracted by use of a suitable organic solvent, and then recovered in accordance with standard procedures such as chromatography, etc.

If desired, the acylated metallocene can be modified further by converting the carbonyl group in accordance with standard chemical procedures to another carbofunctional group. Further reaction of the acylated metallocene nucleus can also be achieved such as, alkylation, sulfonation, and other standard reactions analogous to chemical reactions common to organic aromatic chemistry. In addition, the monovalent functional groups on the silicon atom of the silylorgano radical can also be replaced with other monovalent radicals to provide for additional chemical reactions with the acylated metallocene. For example, a silicon-carbon cleavage reaction can be utilized to form silanol radicals. Silicon halogen bonds can be alkoxylated to form alkoxy silanes, etc.

In order that those skilled in the art will be better able to practice the invention, the following examples are given by way of illustration and not by way of limitation. All parts are by weight.

*Example 1*

Ferrocene was acylated with trimethylsilylpropionyl chloride by the following procedure:

To a solution of 4.52 parts of ferrocene in 25 parts of dry methylene chloride, there was aded with stirring 4 parts of beta-trimethylsilylpropionyl chloride mixed with 25 parts of methylene chloride. To the resulting mixture stirred under dry nitrogen, there was added over an 80 minute period, 3.4 parts of aluminum chloride powder at a rate of about 0.2 part every 5 minutes. After the aluminum chloride had been added, the mixture was stirred for an additional 30 minutes. During the addition, the temperature was maintained at 20° C. to 25° C.

The product was then hydrolyzed by adding the mixture to about 50 parts of ice cold water and about 7 parts of concentrated hydrochloric acid. During the addition of the water, the mixture was agitated. After the mixture was allowed to stand for 16 hours, the methylene chloride layer was separated and washed twice with 15 parts of water, twice with 15 parts of an aqueous 5% potassium hydroxide solution, and again with 15 parts of water. The solvent was then stripped to a constant weight of residue. The crude product was taken up in n-hexane and fractionated by chromatography using a column prepared with neutral alumina and n-hexane. A product was recovered by elution with an equal volume of n-hexane and ether. It was in the form of orange crystals which melted at 59 to 60° C. Its infrared spectrum showed it was trimethylsilylpropionylferrocene. The yield of product based on the starting weight of ferrocene was 76%. Its identity was confirmed by elemental analyses. Calcd. for $C_{16}H_{22}FeOSi$: C, 61.15; H, 7.06; Fe, 17.77; Si, 8.93. Found: C, 61.12; H, 7.14; Fe, 17.76; Si, 8.65.

Based on the above results, the product had the formula:

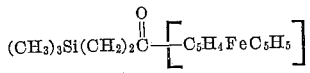

Example 2

An equivalent amount of aluminum chloride was added in the form of small increments to an equimolar mixture of ferrocene and gamma-trimethylsilylbutyryl chloride in methylene chloride. During the addition, the mixture was stirred under dry nitrogen and the stirring was continued until there was no more evolution of hydrogen chloride. The product was then hydrolyzed, worked up, and separated by chromatography. There was obtained an 83% yield of gamma-trimethylsilylbutyrylferrocene having a melting point of 28.5 to 29.5° C. The identity of the product was confirmed by its infrared spectrum and elemental analyses. The formula of the product was

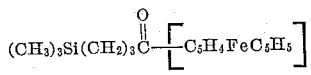

Example 3

1,1'-bis(beta-trimethylsilylpropionyl)ferrocene was prepared as follows:

Aluminum chloride powder was added incrementally, at a uniform rate, over a period of about 2 hours, to a mixture of ferrocene and beta-trimethylsilylpropionyl chloride in methylene chloride stirring under dry nitrogen. The silylpropionyl chloride was utilized in a proportion of 2 moles per mole of ferrocene and the aluminum chloride was utilized in an amount sufficient to provide for the diacylation of the ferrocene in accordance with standard Friedel-Crafts procedures. The mixtures was stirred for about 15 hours until there was no detectable odor of hydrogen chloride. Hydrolysis and work-up of the product was accomplished as previously described. The product was recovered through fractionation by chromatography utilizing a column prepared with neutral 80 mesh alumina and n-hexane. The product melted at 115–116° C. and amounted to 55% yield based on weight of starting ferrocene. Its infrared spectrum and elemental analyses showed that the product was 1,1'-bis-(beta-trimethylsilylpropionyl)ferrocene having the formula:

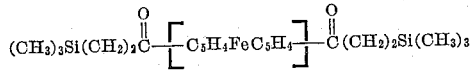

Example 4

A solution of 2 parts of trimethylsilylpropionyl ferrocene in n-hexane was added to a mixture of a mercury-zinc amalgam, and a strong hydrochloric acid solution. The mercury-zinc amalgam was prepared by slowly adding 10 parts of zinc dust to a solution of 1 part of mercuric chloride dissolved in 16 parts of dilute hydrochloric acid. The mixture was allowed to stand for 10 minutes after which the liquid was decanted. There was then added to a mixture of the amalgam and 10 parts of distilled water, 22 parts of concentrated hydrochloric acid.

The mixture of the solution of trimethylsilylpropionylferrocene in n-hexane and the amalgam was refluxed for 19 hours. An infrared spectrum from the solvent phase showed that only those bands for carbonyl were diminished. An additional amount of the amalgam was added to the reaction mixture which was made from an additional 0.5 part of mercuric chloride and 5 parts of zinc dust following the same procedure. The mixture was then refluxed further until an infrared spectrum taken on a sample of solvent phase showed no characteristic carbonyl absorption. The total reflux time was 47 hours. The hexane solution was recovered and combined with additional n-hexane that was employed to wash the amalgam to a colorless wash. The hexane solutions were then dried, stripped and fractionated by chromatography following the procedure described in Example 1. A product was obtained whose infrared spectrum showed no absorption for the carbonyl group. The melting point of the product was 56 to 57° C. and its yield was 78.5 percent. Based on method of preparation, infrared spectrum and elemental analyses, the product was trimethylsilylpropylferrocene having the formula:

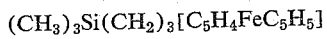

Example 5

A solution of 2.8 parts of 1,1'-bis(beta-trimethylsilylpropionyl)ferrocene in benzene was added to a mixture of concentrated hydrochloric acid and a zinc-amalgam prepared following the procedure of Example 4. The zinc-amalgam was again made from 1 part of mercuric chloride and 10 parts of zinc dust. The mixture of the amalgam and the diketone was refluxed for 35 hours which resulted in approximately 85% reduction of the diketone as shown by infrared data. The mixture was then worked up and fractionated in accordance with the procedure of Example 4. A yellow oil was obtained which melted at 20 to 25° C. The yield of product was 82.2% based on the starting weight of the diketone. Based on infrared data and method of preparation, the product was 1,1'-bis(trimethylsilylpropyl)ferrocene having the formula:

Example 6

There was added with stirring to a mixture of 0.8 part of lithium aluminum hydride in dry ethyl ether, a solution of 15 parts of trimethylsilylbutyrylferrocene. Stirring was maintained for an additional 2 hours at room temperature after the addition was completed. The mixture was then treated cautiously with ice water to decompose any excess lithium aluminum hydride. Fractionation of the mixture was then accomplished by chromatography following the previously described procedure. Thirteen parts of product were recovered which corresponded to a yield of 86% based on starting material. An infrared spectrum of the product showed the presence of the carbinol group. Based on method of preparation and the infrared spectrum, the product was trimethylsilylpropylferrocenylcarbinol having the formula:

Example 7

Following the procedure of Example 4, gammatrimethylsilylbutyrylferrocene of Example 2, was reduced with a zinc amalgam and hydrochloric acid solution to deltatrimethylsilylbutylferrocene. It had a melting point of 5° C. Its identity was confirmed by infrared and elemental analyses. Calcd. for $C_{17}H_{26}FeSi$: C, 65.0; H, 8.3; Fe, 17.8; Si, 8.9. Found: C, 64.8; H, 8.2; Fe, 17.7; Si, 8.7.

There was slowly added 18 parts of concentrated sulphuric acid to 0.55 part of delta-trimethylsilybutylferrocene. The mixture was then agitated for 6 minutes until all of the methane which had been formed was evolved. The mixture was then slowly added to 25 parts of water which was externally cooled. The resulting mixture was then slowly neutralized to a slightly basic condition with an aqueous 50% potassium hydroxide solution. The mixture was then extracted with ether and the extract was dried and stripped to give a yellow oil. The oil was then fractionated by chromatography utilizing n-hexane and 80 mesh alumina as described above. There was obtained .05 part of a yellow oil amounting to a 9% yield based on the weight of starting material. Infrared data showed the product to be delta-dimethylhydroxysilyl-butylferrocene having the formula:

$$(CH_3)_2HOSi(CH_2)_4[C_5H_4FeC_5H_5]$$

Example 8

There was added with stirring to a solution of 4 parts of p-trimethylsilylbenzoylchloride and 3½ parts of ferrocene under a nitrogen atmosphere, 2½ parts of anhydrous aluminum chloride over a period of about 30 minutes. The trimethylsilylbenzoylchloride was made by the procedure taught by Benkeser, J. Am. Chem. Soc. 76, 599 (1954). The reaction was allowed to proceed at room temperature for 2 hours and then it was worked up in accordance with the procedure shown in Example 1. There was obtained an 85% yield, based on the starting ferrocene, of an orange red crystalline product having a melting point of 112° C. to 114° C. The infrared spectrum of the product showed that the product was p-trimethylsilylbenzoylferrocene. Based on method of preparation and its infrared spectrum the product had the formula:

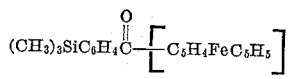

The U.V. spectrum of a 3.04×10⁻⁵ moles/liter solution of p-trimethylsilylbenzoylferrocene in CHCl₃, was determined with a Beckman DK-2 spectrophotometer. Absorption was found in 256–362 millimicron region.

Example 9

In accordance with the procedure of Example 1, osmocene is acylated with trimethylsilylpropionylchloride as follows:

To a solution of 9 parts of osmocene and 25 parts of methylene chloride, there is added with stirring 4 parts of beta-trimethylsilylpropionylchloride dissolved in 25 parts of methylene chloride. There is added in small increments to the resulting mixture while it is stirred under dry nitrogen, 3.4 parts of aluminum chloride over a period of about 80 minutes. The mixture is stirred for an additional 30 minutes after the addition of aluminum chloride, and it is maintained at a temperature at about 20 to 25° C.

The product is then worked up in accordance with the procedure of Example 1. A 60% yield of product is recovered. Its infrared spectrum shows the characteristic absorption for carbonyl, and C—Si. Based on method of preparation and its infrared spectrum, the product is trimethylsilylpropionylosmocene having the formula:

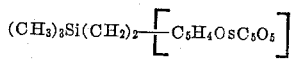

Example 10

The procedure of Example 1 is repeated except that the trimethylsilylpropionylchloride is reacted with ruthenocene as follows:

There is added over a period of 80 minutes, 3.4 parts of aluminum chloride to a solution of 5.4 parts of ruthenocene and 4 parts of beta-trimethylsilylpropionylchloride in 50 parts of dry methylene chloride, while it is stirred under dry nitrogen. After the addition of aluminum chloride, the mixture is stirred for an additional 30 minutes while the temperature of the mixture is maintained at about 25° C. There is recovered a 50% yield of product after the crude reaction product is hydrolyzed and worked up in accordance with the procedure of Example 1. An infrared spectrum of the product shows the presence of carbonyl and C—Si bond. Based on the method of preparation and its infrared spectrum, the product is beta-trimethylsilylpropionylruthenocene having the formula:

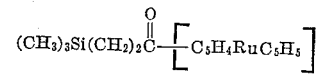

Example 11

A solution of 7 parts of trichloroacetic acid and 3 parts of trimethylsilylpropylferrocenylcarbinol of Example 6 in 130 parts of dry benzene was stirred for 45 minutes while being cooled in an ice bath. There was then added quickly to the solution, 100 parts of a 1.38 M solution of hydrogen azide in benzene. The resulting mixture was stirred at room temperature for 6 to 8 hours. The mixture was then washed with water until it was free of acid as determined with litmus paper. The mixture was then dried over anhydrous magnesium sulphate, filtered and stripped. Following the procedure of Example 1, the mixture was eluted with hexane. There was obtained a 40% yield of product whose infrared spectrum showed the presence of azide. Based on the method of preparation and its infrared spectrum, the product had the formula:

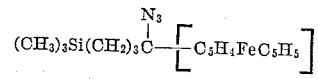

Example 12

There is uniformly added 6.8 parts of aluminum chloride to a solution of 9.04 parts of ferrocene and 9.96 parts of beta-dichloromethylsilylpropionyl chloride in 130 parts of methylene chloride, while maintaining the resulting mixture under a nitrogen purge. A deep violet-colored complex is formed and hydrogen chloride is evolved. After three hours of stirring at room temperature, 9.18 parts of phosphorous oxychloride is added to the mixture in order to decompose the complex in accordance with the teaching of Dye, J. Am. Chem. Soc. 70, 2596 (1948). The reaction mixture is heated to reflux and a precipitate is formed. About half of the solvent is stripped and is replaced with an equal volume of hexane to facilitate the removal of the precipitate. The mixture is filtered and the solvent is removed leaving a residue in the form of an oily liquid. Infrared spectrum of the oily liquid shows the presence of carbonyl, and Si—C bond. Based on the method of preparation and its infrared spectrum, the product is beta-dichloromethylsilylpropionylferrocene having the formula:

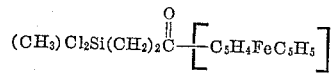

The identity of the product is further confirmed by titrating for hydrolyzable chloride which shows the presence of about a 9% by weight excess of hydrolyzable chloride resulting from contamination of phosphorius oxychloride.

Example 13

There is added to 100 parts of a polydimethyl siloxane polymer having a viscosity of about 7 million centipoises at 25° C., 0.1 part of trimethylsilylpropionylferrocene while the polymer is being milled. To the resulting mixture, there is also added 40 parts of fumed silica followed by 2 parts of benzoyl peroxide. The mixture is then formed into a sheet from which test slabs are cut. Test slabs are also made following the same procedure except trimethylsilylpropionylferrocene is not added to the milled mixture. The test slabs are then press-cured for 10 minutes at about 150° C. and then post-cured for 24 hours at about 315° C. It is found that the compositions containing the compound of Example 1 show superior heat-age resistance as compared to the slabs free of the compound of Example 1.

While the foregoing examples have of necessity been limited to only a few of the many variables within the scope of the present invention, it should be understood that the present invention covers a much broader class of silylorganometallocenes, having radicals shown by Formula 1 bonded to nucleus as described in the specification preceding these examples. It should also be understood that the present invention is also directed to the method for forming a variety of silylorganometallocenes by the employment of a silyl acid chloride of Formula 3 as well as a variety of methods that can be utilized to form various derivatives of such silylorganometallocenes.

What we claim as new and desire to secure by Letters Patent of the United States is:

1. Metallocenyl-substituted organosilicon materials consisting of a metallocene substituted with at least one radical of the formula:

$$A\underset{R}{\overset{R}{Si}}R'Y-$$

where said metallocene is a member selected from the class consisting of ferrocene, osmocene and ruthenocene substituted with radicals selected from the class consisting of hydrogen, and a mixture of hydrogen and monovalent hydrocarbon radicals selected from the class consisting of alkyl radicals, aryl radicals, and mixtures thereof, A is a member selected from the class consisting of an R radical and a hydroxy radical, R is a member selected from the class consisting of hydrogen, a halogen radical, an alkoxy radical, a monovalent hydrocarbon radical, a halogenated monovalent hydrocarbon radical, a cyanoalkyl radical, and a fluoroalkyl radical, R' is a divalent radical of from 2 to 7 carbon atoms selected from the class consisting of an arylene radical, and an alkylene radical, and Y is a carbonyl radical.

2. A metallocene in accordance with claim 1 homoannularly substituted with said silylorgano radicals of (B).

3. A metallocene in accordance with claim 1 heteroannularly substituted with said silylorgano radicals of (B).

4. A metallocenyl substituted organosilicon material in accordance with claim 1, where the metallocene is ferrocene.

5. Trimethylsilylpropionylferrocene.
6. Trimethylsilylbutyrylferrocene.
7. 1,1'-bis(beta-trimethylsilylpropionyl)ferrocene.
8. Delta-dimethylhydroxysilylbutylferrocene.
9. p-Trimethylsilylbenzoylferrocene.
10. Methyldichlorosilylpropionylferrocene.
11. Trimethylsilylpropionylosmocene.
12. Trimethylsilylpropionylruthenocene.
13. Trichlorosilylpropylferrocene.

14. A method which comprises (1) effecting reaction between a metallocene and a silylorganocarboxylic acid halide having the formula:

$$(R'')_3Si-R'-\overset{O}{\overset{\|}{C}}-X$$

(2) hydrolyzing the resulting reaction product of (1), and (3) recovering the hydrolyzate of (2), where R' is a divalent radical having from 2 to 7 carbon atoms selected from the class consisting of an arylene radical and an alkylene radical, R'' is a member selected from the class consisting of hydrogen, a halogen radical, a monovalent hydrocarbon radical, a halogenated monovalent hydrocarbon radical, a cyanoalkyl radical, a fluoroalkyl radical, and mixtures thereof, where said metallocene is a member selected from the class consisting of ferrocene, osmocene, and ruthenocene substituted with radicals selected from the class consisting of hydrogen, and a mixture of hydrogen and monovalent hydrocarbon radicals selected from the class consisting of alkyl radicals, aryl radicals, and mixtures thereof.

15. A method in accordance with claim 14 in which the silylorganocarboxylic acid halide and the metallocene is reacted in the presence of an aluminum halide.

16. A method in accordance with claim 15 in which aluminum chloride is added to a mixture of the metallocene and the said silylorganocarboxylic acid halide.

17. A method in accordance with claim 16 in which the metallocene is ferrocene.

References Cited by the Examiner

Nesmeyanov et al.: Doklady Akad. Nauk. SSSR, vol. 133, pp. 105–7, 1960.

Wu et al.: Izvestia Akad. Nauk. SSSR, pp. 887–892, May 1962.

TOBIAS E. LEVOW, *Primary Examiner.*

E. C. BARTLETT, J. G. LEVITT, P. F. SHAVER, *Assistant Examiners.*

UNITED STATES PATENT OFFICE
CERTIFICATE OF CORRECTION

Patent No. 3,321,501　　　　　　　　　　　　　　May 23, 1967

Edward V. Wilkus et al.

It is hereby certified that error appears in the above numbered patent requiring correction and that the said Letters Patent should read as corrected below.

Column 11, line 16, after "one" insert -- silylorgano --; line 31, before "a" insert -- and --; line 32, strike out "and a fluoroalkyl radical,"; lines 37, 39 and 40, for "radicals of (B)", each occurrence, read -- radical --; column 12, line 20, before "a", first occurrence, insert -- and --; same line 20, strike out "a fluoro-"; line 21, strike out "alkyl radical,".

Signed and sealed this 28th day of November 1967.

(SEAL)

Attest:

Edward M. Fletcher, Jr.

Attesting Officer

EDWARD J. BRENNER

Commissioner of Patents